US007207033B2

(12) United States Patent
Kung et al.

(10) Patent No.: US 7,207,033 B2
(45) Date of Patent: Apr. 17, 2007

(54) AUTOMATIC BACKUP AND RESTORE FOR CONFIGURATION OF A LOGICAL VOLUME MANAGER DURING SOFTWARE INSTALLATION

(75) Inventors: Lucy Ya Mei Kung, Milpitas, CA (US); Che Lui Shum, Milpitas, CA (US); Limei Shaw, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/637,269

(22) Filed: Aug. 8, 2003

(65) Prior Publication Data

US 2005/0034122 A1     Feb. 10, 2005

(51) Int. Cl.
*G06F 9/44*     (2006.01)
*G06F 9/445*    (2006.01)
*G06F 15/177*   (2006.01)

(52) U.S. Cl. ................... 717/106; 717/174; 709/220
(58) Field of Classification Search ................ 707/200, 707/201, 202, 204; 717/174, 175, 176
See application file for complete search history.

(56) References Cited

U.S. PATENT DOCUMENTS 5,704,031 A    12/1997    Mikami et al. ........ 395/182.02

(Continued)

OTHER PUBLICATIONS

Gibson, Garth A; van Meter, Rodney; "Network Attached Storage Architecture", p. 37-45, Nov. 2000, ACM retireved Jun. 16, 2006.*

(Continued)

*Primary Examiner*—Mary Steelman
(74) *Attorney, Agent, or Firm*—Kunzler & Associates

(57) ABSTRACT

A process, apparatus, and system are disclosed for automatically backing up and restoring a system configuration during the installation of new software on a software device. The apparatus may be embodied as a software installation module having a pre-removal module and a post-installation module. The pre-removal and post-removal procedures are embedded within a systems packaging files so that they may be automatically executed during the installation procedures for installing the new software. The apparatus may also include a recovery module configured to perform procedures that are similar to, but potentially more thorough than the procedures implemented by the post-installation procedure. Specifically, the apparatus may be incorporated in a server within a storage area network (SAN) and configured to operate with a plurality of physical disk drives also connected to the storage area network (SAN).

29 Claims, 11 Drawing Sheets

U.S. PATENT DOCUMENTS

| | | | | |
|---|---|---|---|---|
| 2003/0018657 A1* | 1/2003 | Monday | ...................... | 707/204 |
| 2003/0055926 A1 | 3/2003 | Kwok et al. | ................. | 709/221 |
| 2003/0225986 A1* | 12/2003 | Teshima | ...................... | 711/165 |
| 2004/0034671 A1* | 2/2004 | Kodama | ...................... | 707/204 |
| 2004/0143607 A1* | 7/2004 | Beck | .......................... | 707/201 |
| 2005/0108487 A1* | 5/2005 | Kobayashi et al. | .......... | 711/162 |

OTHER PUBLICATIONS

Skeie, Tom A; Rusnack, Michael R.; "HP Disk Array: Mass Storage Fault Tolerance for PC Servers", p. 71-81, Jun. 1995 Hewlett Packard Journal, retrieved from scholar.google.com search Jun. 16, 2006.*

Teigland, David; Mauelshagen, Heinz; "Volume Managers in Linux", p. 1-23, tretrieved from scholar.google.com search Jun. 16, 2006.*

* cited by examiner

AUTOMATIC BACKUP AND RESTORE FOR CONFIGURATION OF A LOGICAL VOLUME MANAGER DURING SOFTWARE INSTALLATION

BACKGROUND OF THE INVENTION

1. Field of the Invention

This invention relates to software installations on a computerized device and more particularly, to an automated system backup and restore during a software installation on a computerized device.

2. Description of the Related Art

In current enterprise environments, businesses typically employ a large storage area network (SAN) that is made up of several large storage servers and numerous storage devices. Each storage area network (SAN) generally includes at least one logical volume manager (LVM) that provides a mapping layer between the application programs running on, for example, a workstation computer, and the physical disks on which the network data is ultimately stored. The logical volume manager (LVM) typically has a system configuration that is large and complex.

When software on a storage device needs to be migrated or upgraded, a network system administrator generally has to manually perform several tasks that are error prone and extremely time consuming. Additionally, conventional migration/upgrade methods generally require that the storage servers be rebooted after the installation of the new software, which may disrupt all of the users and user activity on the network. When the system is rebooted, all of the application programs are shut down, even if they are not related to the software devices involved in the migration/upgrade.

FIG. 1 depicts a conventional method 100 for manually backing up and restoring a system configuration during a software installation. The method 100 begins 102 by manually backing 104 up the system configuration. This is conventionally a manual procedure performed by a system or network administrator. The administrator then manually inactivates 106 the configuration of the logical volume manager (LVM) in order to install 108 the new software on the storage device or devices. After the new software has been installed, the administrator then manually reconfigures 110 the storage devices and restores 112 the configuration of the logical volume manager (LVM). The conventional method 100 then ends 114. As discussed above, conventional software installation practices require a user to manually backup a system configuration prior to installing the new software and then manually restore the system configuration after the new software is installed.

What is needed is a process, apparatus, and system that automatically backup and restore a system configuration during the installation of new software on a software device. Beneficially, such a process, apparatus, and system would be embedded within a system packaging file so as to limit the need for human involvement in the software migration/upgrade process. The process, apparatus, and system would also beneficially avoid unnecessary human errors that result from human involvement with the complicated system configuration.

BRIEF SUMMARY OF THE INVENTION

The present invention has been developed in response to the present state of the art, and in particular, in response to the problems and needs in the art that have not yet been fully solved by currently available software installation systems. Accordingly, the present invention has been developed to provide a process, apparatus, and system for automated system backup and restore during a software installation that overcome many or all of the above-discussed shortcomings in the art.

The apparatus for automated system backup and restore is in one embodiment provided with a logic unit containing a plurality of modules configured to functionally execute the necessary steps of automatically backing up and restoring a system configuration during a software installation. These modules in the described embodiments include a software installation module, a file packaging module, a pre-removal module, a backup module, a removal module, a post-installation module, a reconfiguration module, a restoration module, a recovery module, a system configuration module, a volume group identification module, a physical volume identification module, a physical volume device type module, a volume group attribute module, a volume group file systems module, a software device module, a mounting module, a status module, and a conversion module.

The apparatus, in one embodiment, is configured to automatically back up and restore a system configuration during a software installation. The software installation module may be located in a server and configured to assist with the installation of new software on a software device, such as a physical disk device driver. The file packaging module may be configured to embed the backup and restore procedures in the server packaging files so that the backup and restore procedures may be automatically executed during a migration or upgrade of storage device software.

The pre-removal module, in one embodiment, may be configured to automatically execute a pre-removal procedure prior to installing the software on the software device. One embodiment of the pre-removal module described includes the backup module and removal module. The backup module maybe configured to backup the system configuration of, for example, a logical volume manager (LVM) prior to the installation of new software on the software device. The removal module may be configured to remove the software device from its electronic environment prior to the installation of new software on the software device.

Similarly, the post-installation module is preferably configured to automatically execute a post-installation procedure after installing the software on the software device. One embodiment of the recovery module as described includes the reconfiguration module and the recovery module. The reconfiguration module may be configured to reconfigure the software device after new software has been installed. The restoration module may be configured to restore the system configuration of, for example, a logical volume manager (LVM) after the installation of new software on the software device.

The recovery module disclosed also includes a reconfiguration module and a restoration module, which may be substantially similar to the reconfiguration module and restoration module, respectively, of the post-installation module. The recovery reconfiguration module may be configured to reconfigure the software device after a failed attempt by the post-installation module. Likewise, the recovery restoration module may be configured to restore the system configuration of, for example, a logical volume manager (LVM) after a failed attempt by the post-installation module.

The system configuration module disclosed includes the volume group identification module, the physical volume identification module, the physical volume device type module, the volume group attribute module, and the volume group file systems module. The system configuration module may be configured to store system configuration information for the logical volume manager (LVM), for example.

The volume group identification module is preferably configured to store a volume group identifier (VGID). The physical volume identification module is preferably configured to store a physical volume identifier (PVID). The physical volume device type module is preferably configured to store a device type, such as a hard disk drive identifier, for a given physical volume. The volume group attribute module is preferably configured to store an attribute of a volume group, such as whether the volume group is active. The volume group file systems module is preferably configured to store an indicator to indicate whether a file system is mounted, for example.

The software device module in the depicted embodiments includes the mounting module, the status module, and the conversion module. The software device module may be configured to administer the operation of the software device during the installation of new software. The mounting module is preferably configured to facilitate mounting and unmounting a file system. The status module is preferably configured to vary on and vary off a volume group. The conversion module is preferably configured to convert a volume group from software device based to server based, and vice-versa.

A system of the present invention is also presented for automated system backup and restore during installation of new software on a software device. The system, in one embodiment, includes a storage server operating in connection with a logical volume manager (LVM) to manage a plurality of storage software devices, such as physical hard disk drives. The system discussed also includes a software installation module, a pre-removal module, a post-installation module, and a file packaging module similar to those discussed above. A further embodiment of the system may also include the recovery module as discussed above. In a particular embodiment of the system, neither the storage server nor the logical volume manager (LVM) requires a system reboot following installation of the new software on the storage software device.

The system may further include multiple storage servers connected together within a storage area network (SAN) and may communicate with one or more logical volume managers (LVMs) also connected to the network.

A process of the present invention is also presented for automated system backup and restore during installation of new software on a software device. The process in the disclosed embodiments substantially includes the steps necessary to carry out the functions presented above with respect to the operation of the described apparatus and system. In one embodiment, the process includes automatically executing a pre-removal procedure prior to installing the software on the software device, automatically executing a post-installation procedure after installing the software on the software device, embedding the pre-removal and post-installation procedures in a packaging file.

In a further embodiment, the process also includes backing up the system configuration of, for example, the logical volume manager (LVM) and removing the software device prior to the installation of the new software on the software device. A still further embodiment of the process discussed includes reconfiguring the software device and restoring the system configuration of, for example, the logical volume manager (LVM) after installing the software on the software device.

The process may also include reconfiguring the software device via, for example, the recovery module, after a failed attempt by the post-installation module to reconfigure the software device. Likewise, the process may include restoring the system configuration of the logical volume manager (LVM) after a failed attempt by the post-installation module to restore the system configuration.

The process may further comprise storing the system configuration information and managing the operation of the storage software device during the installation.

The present invention may also be embodied in a computer readable medium configured to carry out the process described above, and may also be embodied in the form of an apparatus having the means for implementing the process described above.

These features and advantages of the present invention will become more fully apparent from the following description and appended claims, or maybe learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
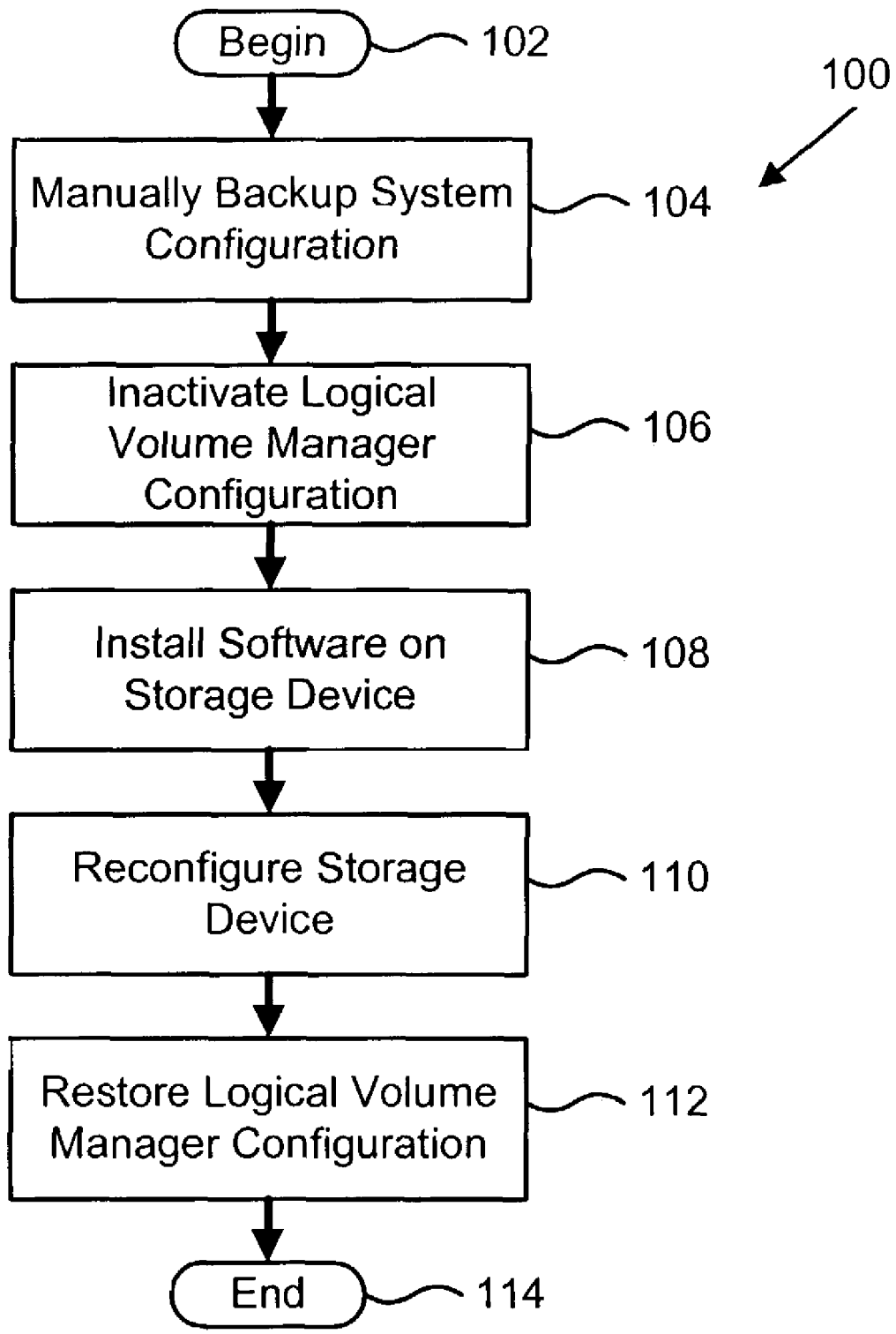
FIG. 1 is a schematic block diagram illustrating one embodiment of a conventional method for backing up and restoring a system configuration in accordance with the present invention.
Figure 2:
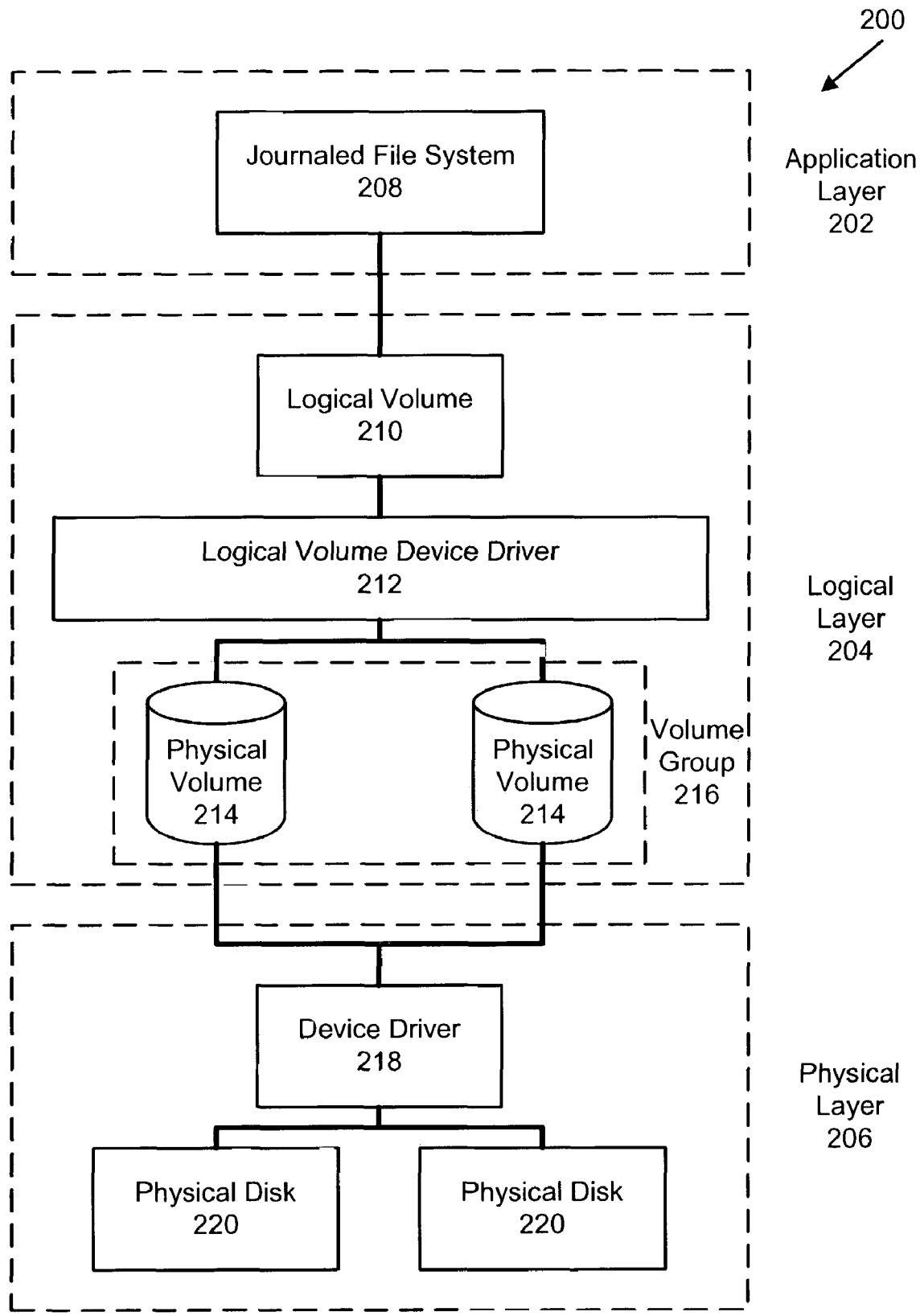
FIG. 2 is a schematic block diagram illustrating one embodiment of a logical volume manager environment in accordance with the present invention.

FIG. 2 depicts a logical volume manager (LVM) environment 200. The depicted LVM environment 200 includes three layers, namely, an application layer 202, a logical layer 204, and a physical layer 206. In one embodiment, the application layer 202 is a journaled file system (JFS) 208. In an alternative embodiment, the application layer 202 may be a relational database management system (RDBMS) (not shown). Application programs execute within the application layer 202 using logical blocks. A logical block is a unit of data including a number of bytes of data. For example, one logical block may include 512 bytes of data.

The application programs executing within the application layer 202 often need to store and access data within the physical layer 206. The logical layer 204 represents a mapping layer that operates on logical volumes 210 that include one or more logical blocks. A logical volume 210 is defined in terms of the information that it contains rather than the physical attributes. A logical volume 210 represents the data as used by an application program rather than the physical placement of the data in a storage device.

The logical layer 204 includes a logical volume device driver (LVDD) 212 that is a pseudo-device driver that operates on the logical volumes 210 and manages and processes all input/output (I/O). The logical volume device driver (LVDD) 212 maps the logical volume 210 to a physical volume 214 that represents the physical placement of the data in a storage device. Each physical volume 214 may be assigned a name and a physical volume identifier (PVID) that is a type of serial number that identifies the physical volume 214. The physical volume identifier (PVID) is often a combination of a server's serial number and the date that the physical volume 214 is created.

One or more physical volumes 214 maybe grouped together to form a volume group 216. A physical volume 214 may be added or removed from the volume group 216 after the volume group 216 has been created. Each volume group 216 may be assigned a name and a volume group identifier (VGID) that is similar to the physical volume identifier (PVID) for a physical volume 214. The volume group identifier (VGID) often is used as a base for the logical volume identifier (LVID) of a logical volume 210 within the volume group 216. A physical volume 214 is transferred via a device driver 218 to or from a physical disk 220. The device driver 218, in one embodiment, is a small computer system interface (SCSI) disk device driver. In an alternative embodiment, the device driver 218 may be a serial storage architecture (SSA) disk device driver. The physical disk 220 may be a magnetic hard disk drive (HDD), an optical drive, or any other type of electronic storage device.

Figure 3:
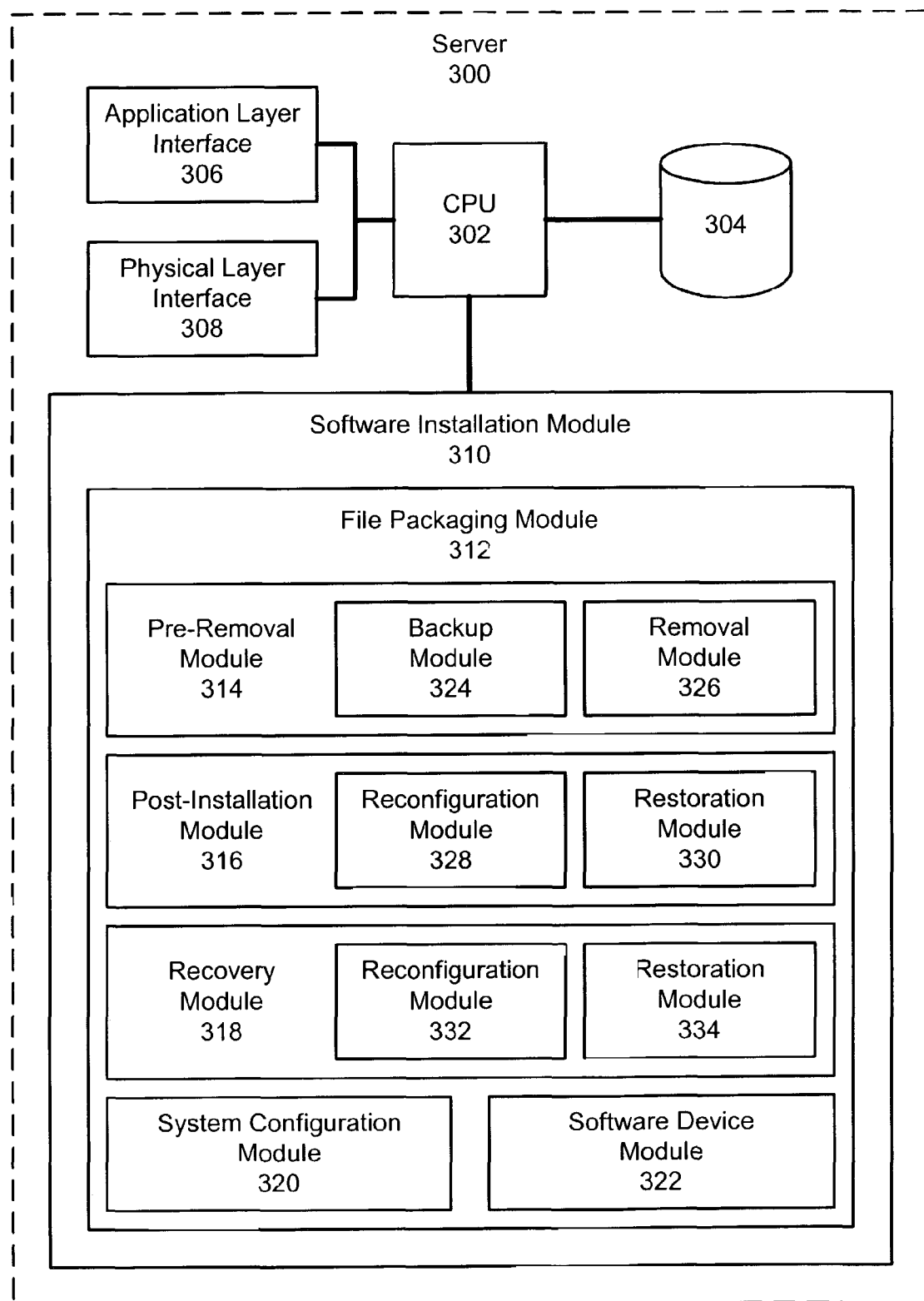
FIG. 3 is a schematic block diagram illustrating one embodiment of a logical volume manager in accordance with the present invention.

FIG. 3 depicts a schematic block diagram of a server 300 that may be employed in conjunction with the logical volume manager (LVM) environment shown in FIG. 2. The depicted server 300 includes a central processing unit (CPU) 302, a local electronic memory device 304, an application layer interface 306, a physical layer interface 308, and a software installation module 310. In one embodiment, the server 300 may comprise a freestanding computer or workstation connected to a network. In another embodiment, the server 300 may comprise a storage server.

The application layer interface 306 is configured, in one embodiment, to process communications between the application layer 202 and the logical layer 204 of the logical volume manager (LVM) environment 200. For example, the application layer interface 306 may be configured to receive logical blocks operated on by an application program to be stored on a physical disk 220 within the physical layer 206. The application layer interface 306 also may be configured to communicate logical blocks, such as a saved file, to the application layer 202 to be process by an application program.

The physical layer interface 308 is configured, in one embodiment, to process communications between the physical layer 206 and the logical layer 204 of the logical volume manager (LVM) environment 200. For example, the physical layer interface 308 may communicate physical volumes 214 to physical layer 206 to be stored on the physical disks 220. The physical layer interface 308 also may be configured to receive physical volumes 214 from the physical layer 206 in response to a file access request from an application program within the application layer 202.

The depicted software installation module 310 includes a file packaging module 312 that includes a pre-removal module 314, a post-installation module 316, a recovery module 318, a system configuration module 320, and a software device module 322. The software installation module 310, in one embodiment, is configured to assist in the installation of new software on a software device, such as a physical disk device driver 218. The file packaging module 312 is included in the software installation module 318 and is configured, in one embodiment, to embed in the packaging files backup and restore procedures that may be automatically executed during a migration or upgrade of storage device software.

The depicted file packaging module 312 includes a pre-removal module 314, a post-installation module 316, a recover module 318, a system configuration module 320, and a software device module 322. The pre-removal module 314 is configured to backup and deactivate a logical volume manager (LVM) system configuration, such as through a backup module 324, and to remove the system configuration, such as through a removal module 326. If a failure occurs during execution of a pre-removal procedure, an administrator may identify the cause of the failure, fix the cause of the failure, and execute the pre-removal procedure again.

The post-installation module 314 is configured to reconfigure a software device, such as through a reconfiguration module 328, and restore the logical volume manager (LVM) system configuration, such as through a restoration module 330, after new software has been installed on the software device. In one embodiment, the restoration module 330 uses the system configuration stored by the backup module 324. If a failure occurs during execution of a post-installation procedure, the software installation will complete successfully, but an administrator may need to execute a recovery procedure in order to fully restore the logical volume manager (LVM) system configuration.

In one embodiment, the administrator may execute the recovery procedure using the recovery module 318. The depicted recovery module 318 includes a reconfiguration module 332 and a restoration module 334, which are preferably substantially similar to the reconfiguration module 328 and restoration module 330, respectively, within the post-installation module 316. The reconfiguration module 332 and restoration module 334 within the recovery module 318, however, may perform additional tests to determine how much, if any, of the logical volume manager (LVM) system configuration is already restored.

Figure 4:
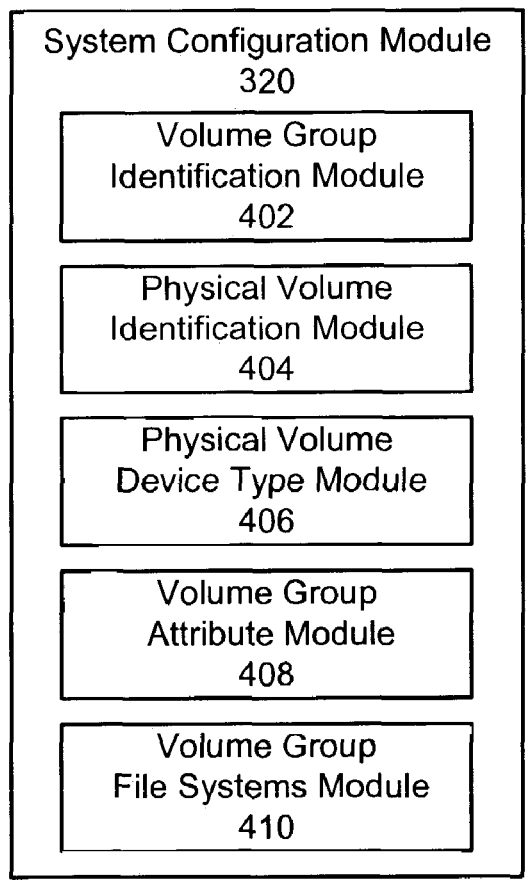
FIG. 4 is a schematic block diagram illustrating one embodiment of a system configuration module in accordance with the present invention.

The system configuration module 320 is configured, in one embodiment, to store information about the system configuration of the logical volume manager (LVM) and is described in greater detail in conjunction with FIG. 4. The software device module 322 is configured, in one embodiment, to manage the operation of the software device and is described in more detail in conjunction with FIG. 5. The system configuration module 320 may be employed by the backup module 324 within the pre-removal module 314 or by one of the reconfiguration modules 328, 332 within the post-installation module 316 or recovery module 318. The software device module 322 may be employed by the removal module 326 within the pre-removal module or by one of the restoration modules 330, 334 within the post-installation module 316 or recovery module 318.

FIG. 4 depicts one embodiment of a system configuration module 320 of FIG. 3 that includes a volume group identification module 402, a physical volume identification module 404, a physical volume device type module 406, a volume group attribute module 408, and a volume group file systems module 410.

The volume group identification module 402 is preferably configured to store the volume group identifier (VGID) of a volume group. Similarly, the physical volume identification module 404 is preferably configured to store the physical volume identifier (PVID) of a physical volume. In one embodiment, the volume group identifier (VGID) and physical volume identifier (PVID) may be stored on the electronic memory device 304 within the server 300. In an alternative embodiment, the identifiers may be stored on a separate electronic storage device.

The physical volume device type module 406 is preferably configured to store a device type of a physical volume, for example if the software device is a hard disk drive. The volume group attribute module 408 is preferably configured to store one or more attributes associated with a volume group, such as whether the volume group is a concurrent volume group that may be accessed concurrently by multiple servers, for example. The volume group file systems module 410 is preferably configured to store information regarding the file systems, such as whether a software device is presently mounted or not mounted.

Figure 5:
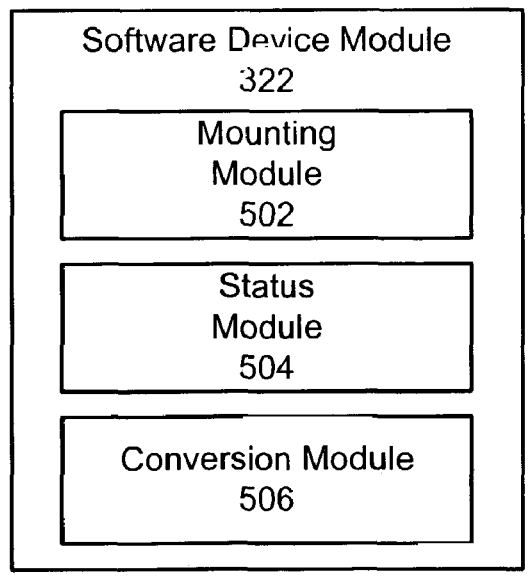
FIG. 5 is a schematic block diagram illustrating one embodiment of a software device module in accordance with the present invention.

FIG. 5 depicts one embodiment of a software device module 322 of FIG. 3 that includes a mounting module 502, a status module 504, and a conversion module 506. The mounting module 502 is, in the depicted embodiment, configured to mount and unmount a software device, such as a physical disk 220 in the physical layer 206. The status module 504 is preferably configured to vary on and vary off a volume group 216. For example, the pre-removal module 314 may invoke the status module 504 to vary off an active volume group 216 prior to installation of new software on a software device. Similarly, the post-installation module 316 may invoke the status module 504 to vary on a volume group 216 after installation of the new software if the volume group 216 was active prior to the installation.

The conversion module 506 is preferably configured to convert a software device based volume group 216 to a server based volume group 216, such as prior to installation of new software. The conversion module 506 is further configured to convert a server based volume group 216 to a software device based volume group 216, such as after installation of new software. In another embodiment, the conversion module 506 may convert a software device based volume group 216 to a backup device based volume group 216 by copying a volume group 216 from a software device to a backup storage device (not shown).

Figure 6:
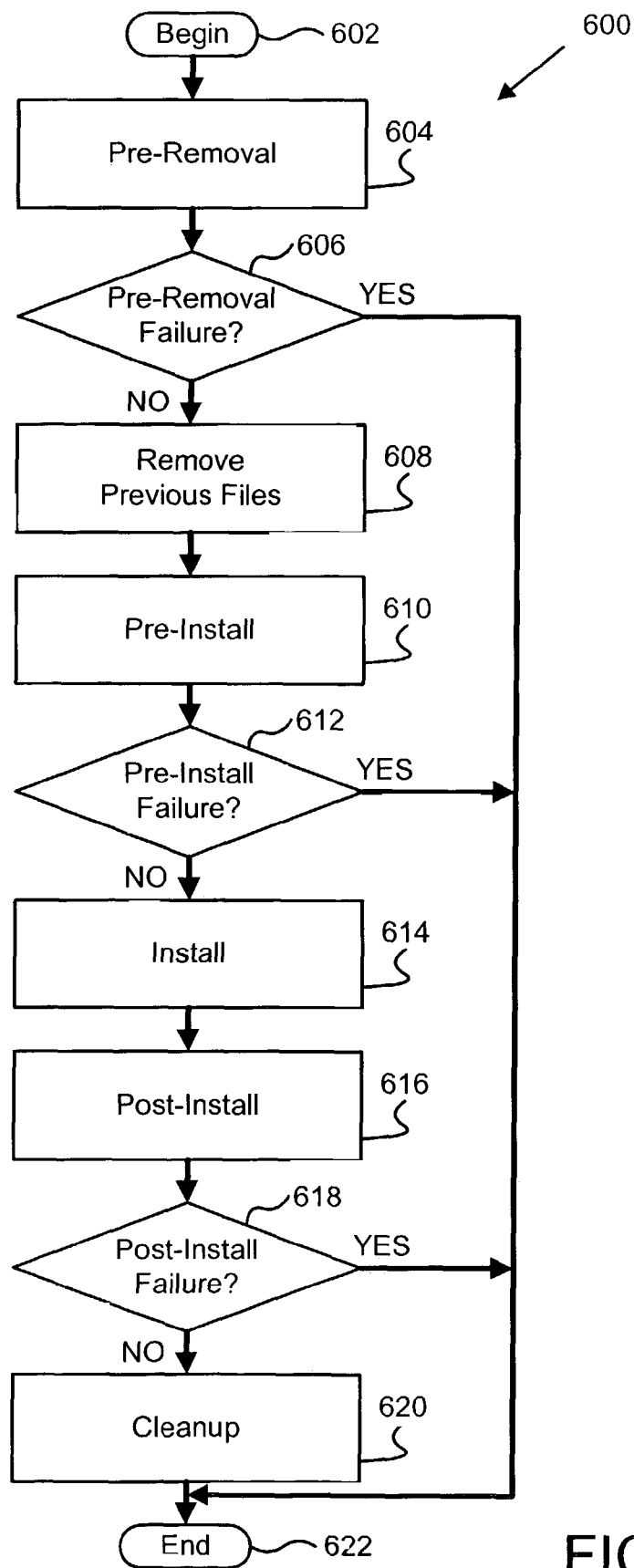
FIG. 6 is a schematic flow chart diagram illustrating on embodiment of a software installation process in accordance with the present invention.

FIG. 6 depicts one embodiment of a high level software installation process 600 that may be employed independently or within the logical volume manager (LVM) environment that is depicted in FIG. 2 and explained above. Preferably, each of the steps of FIG. 6 is performed automatically by a software installation module such as the software installation module 310 of FIG. 3.

The depicted software installation process 600 begins 602 by performing 604 a pre-removal sub-process, one embodiment of which will be discussed in more detail in conjunction with FIGS. 7a and 7b below. The software installation process 600 then determines 606 if the pre-removal sub-process failed to execute properly. If the pre-removal process did not fail, the software installation process 600 removes 608 the previous files from the software device and performs 610 a pre-install sub-process. The pre-install sub-process is not altered or affected by the present invention and is not discussed in detail.

The software installation process 600 then determines 612 if the pre-installation sub-process failed to execute properly. If the pre-install sub-process did not fail, the new software is then installed 614 on the software device. The software installation process 600 then performs 616 a post-install sub-process, one embodiment of which will be discussed in more detail in conjunction with FIGS. 8a and 8b below. The software installation process 600 then determines 618 if the post-installation sub-process failed to execute properly. If the post-installation sub-process did not fail, the software installation process 600 performs 620 some conventional cleanup procedures, such as working with an object database manager (ODM). The depicted software installation process 600 then ends 622. If at some point the software installation process 600 determines 606, 612, 618 that a sub-process failed to execute properly, the software installation process 600 may also end 622.

Figure 7A:
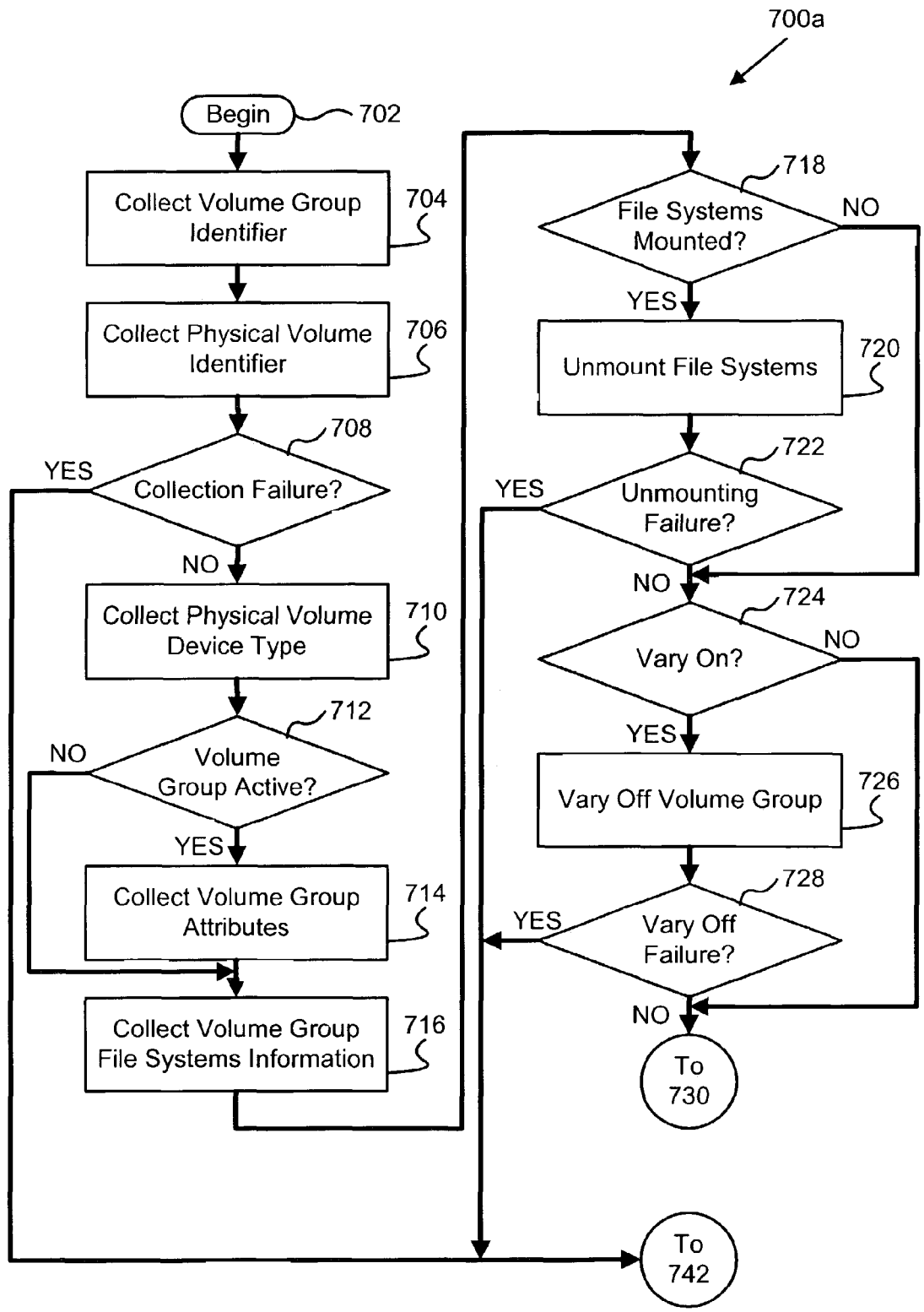
FIGS. 7a and 7b are schematic flow chart diagrams illustrating one embodiment of a pre-removal process in accordance with the present invention
Figure 7B:
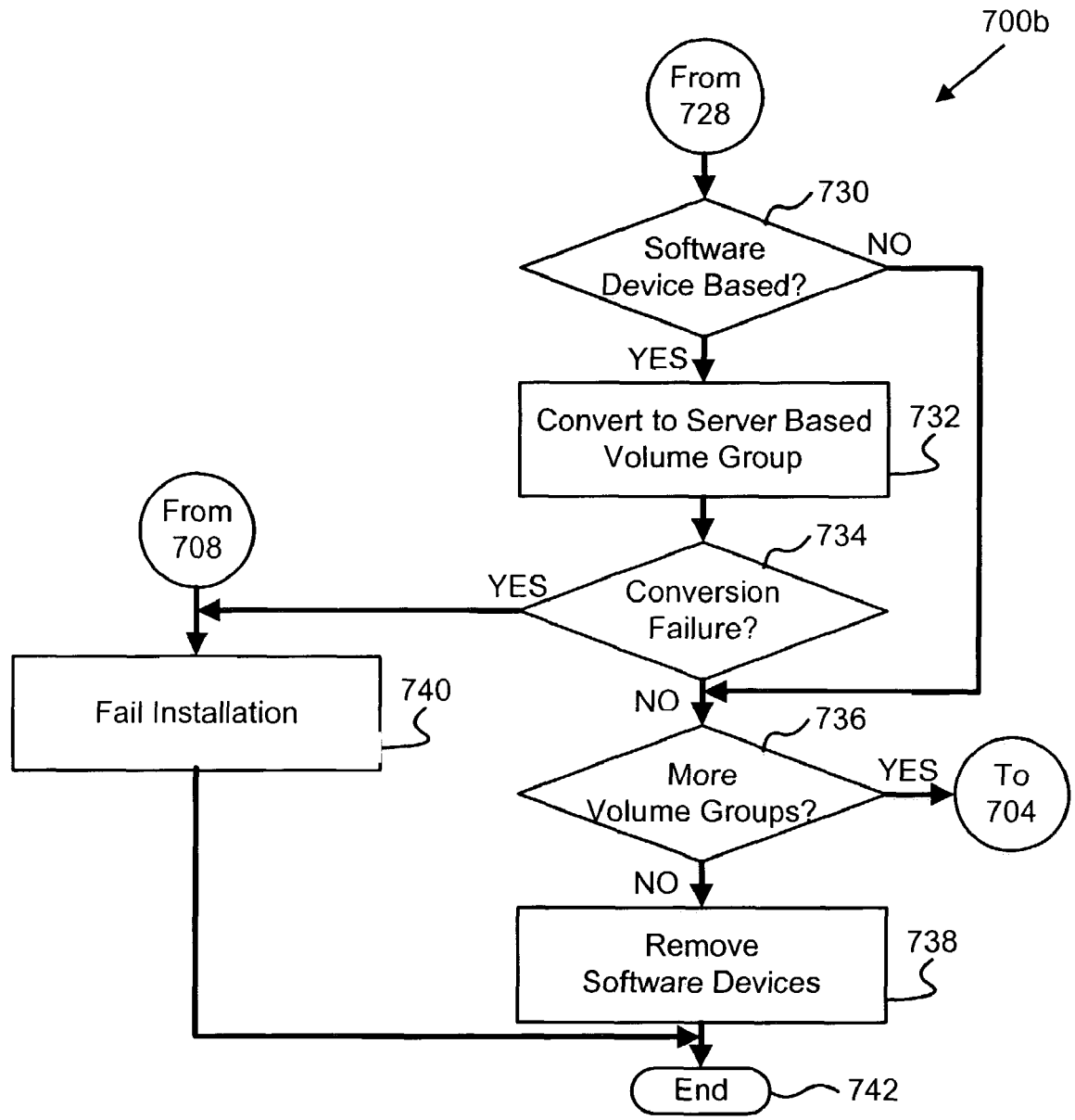

FIGS. 7a and 7b depict one embodiment of a more detailed pre-removal process 700 given by way of example of the pre-removal sub-process 604 of FIG. 6. For convenience, the pre-removal process 700 is shown in a first part 700a and a second part 700b, but will be referred to collectively as the pre-removal process 700. Execution of the pre-removal process 700 is preferably administered by the pre-removal module 314 of the software installation module 310 in the server 300.

The depicted pre-removal process 700 begins 702 by collecting 704 the volume group identifier (VGID) for each volume group 216 stored on the software device to be migrated or upgraded. As described above, the volume group identifier (VGID), in one embodiment, may be collected by the volume group identification module 402 and stored in the electronic memory device 304 of the server 300. The pre-removal process 700 then collects 706 the physical volume identifier (PVID) for each physical volume 214 stored on the software device. The physical volume identifier (PVID) may be collected by the physical volume identification module 404 and stored in the electronic memory device 304 of the server 300.

The pre-removal process 700 then determines 708 if there is a failure in collecting the physical volume identifier (PVID). If there was not a failure, the pre-removal process 700 collects 710 the device type of each physical volume 214 stored in the software device. The physical volume device type may be collected, in one embodiment, by the physical volume device type module 406 and stored in the electronic memory device 304 of the server 300.

The pre-removal process 700 subsequently determines 712 if a volume group 216 is active on the software device. If a volume group 216 is active, the pre-removal process 700 collects the attributes of the volume group 216, such as by the volume group attribute module 408, and stores the attributes, for example, in the electronic storage memory 304 of the server 300.

After collecting 714 the attributes of an active volume 216, or if the volume group is determined 712 to not be active, the pre-removal process 700 collects 716 file systems information of the volume group 216. In one embodiment, the pre-removal module 314 employs the volume group file systems module 410 to collect the file systems information.

The pre-removal process 700 then determines 718 if the file systems are mounted. if the file systems are mounted, the pre-removal process 700 unmounts 720 the file systems and determines 722 if an unmounting failure occurred. In one embodiment, the pre-removal module 314 employs the mounting module 502 to unmount the file systems. If no file systems were mounted or if the mounted file systems were successfully unmounted, the pre-removal process 700 continues by determining 724 if a volume group 216 is varied on. If a volume group 216 is determined 724 to be varied on, the pre-removal process 700 varies off 726 the volume group 216, such as through the status module 504 of the software device module 322. The pre-removal process 700 then determines 728 if a vary off failure occurred. If no volume groups 216 were varied on or if the volume groups 216 were successfully varied off, the pre-removal process 700 determines 730 if a volume group 216 is software device based.

If it is determined that a volume group 216 is software device based, the pre-removal process 700 then converts 732 the volume group from software device based to server based, such as through the conversion module 506, for example. The pre-removal process 700 then determines 734 if a conversion failure occurred. If the volume group 216 is not software device based or if the volume group was successfully converted, the pre-removal process then determines 736 if additional volume groups 216 need to be processed and, if so, iteratively returns to step 704 to collect the volume group identifier (VGID) and to repeat the described steps of the pre-removal process 700. After processing all of the necessary volume groups 216, the pre-removal process 700 then removes 738 the software devices in preparation to install the new software.

If the pre-removal process 700 determines 708 that there is a correction failure, determines 722 that an unmounting failure has occurred, determines 728 that there is a vary off failure, or determines 734 that a conversion failure has occurred with one or more of the volume groups 216 being processed, the installation fails 740. After either failing 740 the installation or successfully removing 738 the software devices, the depicted pre-removal process 700 ends 742.

Figure 8A:
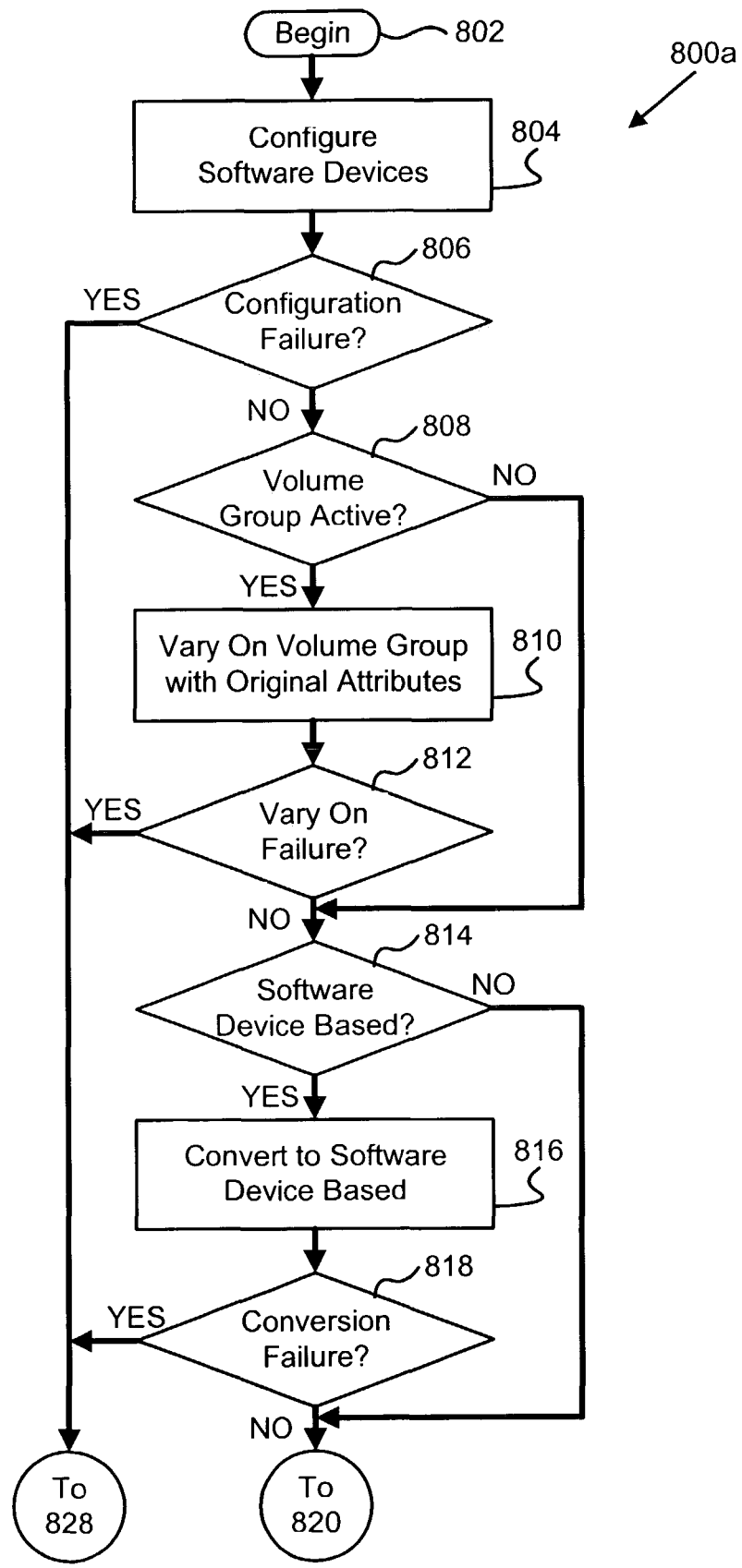
FIGS. 8a and 8b are schematic flow chart diagrams illustrating one embodiment of a post-installation process in accordance with the present invention.
Figure 8B:
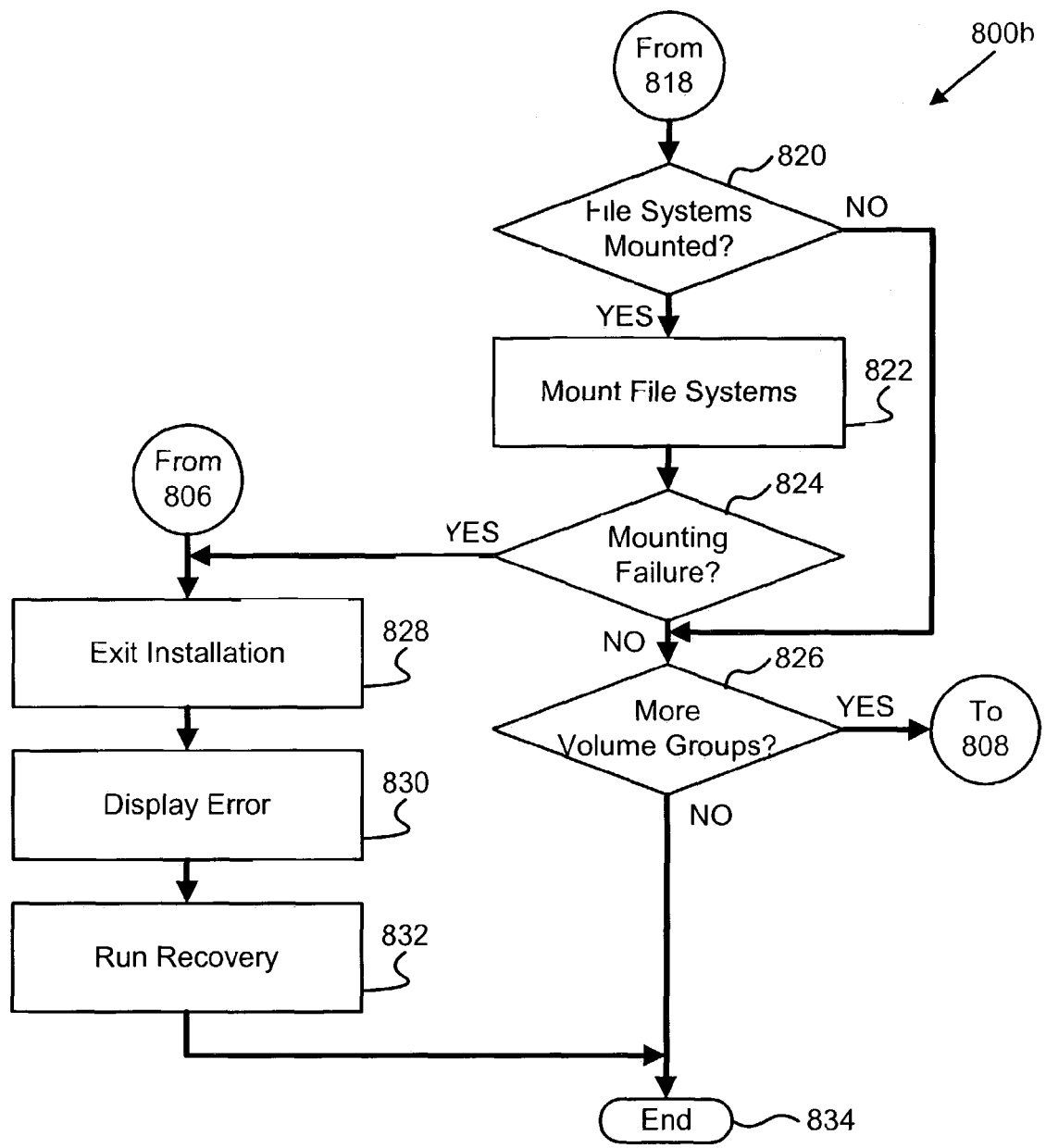

FIGS. 8a and 8b depict one installation of a more detailed post-installation process 800 given by way of example of the post-installation sub-process 616 of FIG. 6. For convenience, the post-installation process 800 is shown in a first part 800a and a second part 800b, but will be referred to collectively as the post-installation process 800. Execution of the post-installation process 800 is preferably administered by the post-installation module 316 of the software installation module 310 in the server 300.

As described above, the post-installation process 800 occurs after the new software has been installed on a software device. The post-installation process 800 is designed to reconfigure the software devices having the newly installed software and restore the system configuration of the logical volume manager (LVM). The depicted post-installation process 800 begins 802 by configuring 804 the software devices.

The post-installation process 800 then determines 806 if a configuration failure occurred. If a configuration failure did not occur, the post-installation process 800 determines 808 if a volume group 216 was active prior to the installation of the new software. In one embodiment, the system configuration module 320 is configured to determine if a volume group was active. In another embodiment, the post-installation module 316 may access stored volume group attributes to determine if the volume group was active. If the volume group 216 was active, the post-installation process 800 varies on the volume group 216 and, in one embodiment, restores the original attributes of the volume group 216. The post-installation process 800 then determines 812 if a vary on failure occurred.

If the volume group 216 was not active or if the volume group 216 was successfully varied on, the post-installation process 800 then determines 814 if the volume group 216 was software device based prior to the installation of the new software. In one embodiment, the post-installation module 316 may employ the conversion module 506 to determine if the volume group 216 was software device based. If the volume group 216 was software device based, the post-installation process 800 converts 816 the volume group 216 back to software device based and then determines 818 if a conversion failure occurred.

If the volume group 216 was not software device based or if the volume group 216 was successfully converted to software device based, the post-installation process 800 then determines 820 if the file systems were mounted prior to the installation of the new software. If the file systems were mounted, the post-installation process 800 then mounts 822 the file systems and determines 822 if a mounting failure occurred. If the file systems were not mounted or if the file systems were successfully mounted, the post-installation process 800 determines 826 if additional volume groups 216 need to be processed and, if so, iteratively returns to step 808 to determine if the additional volume group 216 was active and to repeat the described steps of the post-installation process 800.

If the post-installation process 800 determines 806 that there is a configuration failure, determines 812 that there is a vary on failure, determines 818 that there is a conversion failure, or determines 824 that there is a mounting failure with one or more of the volume groups 216 being processed, the post-installation process 800 proceeds to exit 828 the installation and display 830 an error to a system administrator. In one embodiment, the post-installation process 800 may advise the administrator to run 832 a recovery sub-process. After either processing all of the necessary volume groups 216 or exiting the installation due to a failure, the depicted post-installation process 800 ends 834.

Figure 9A:
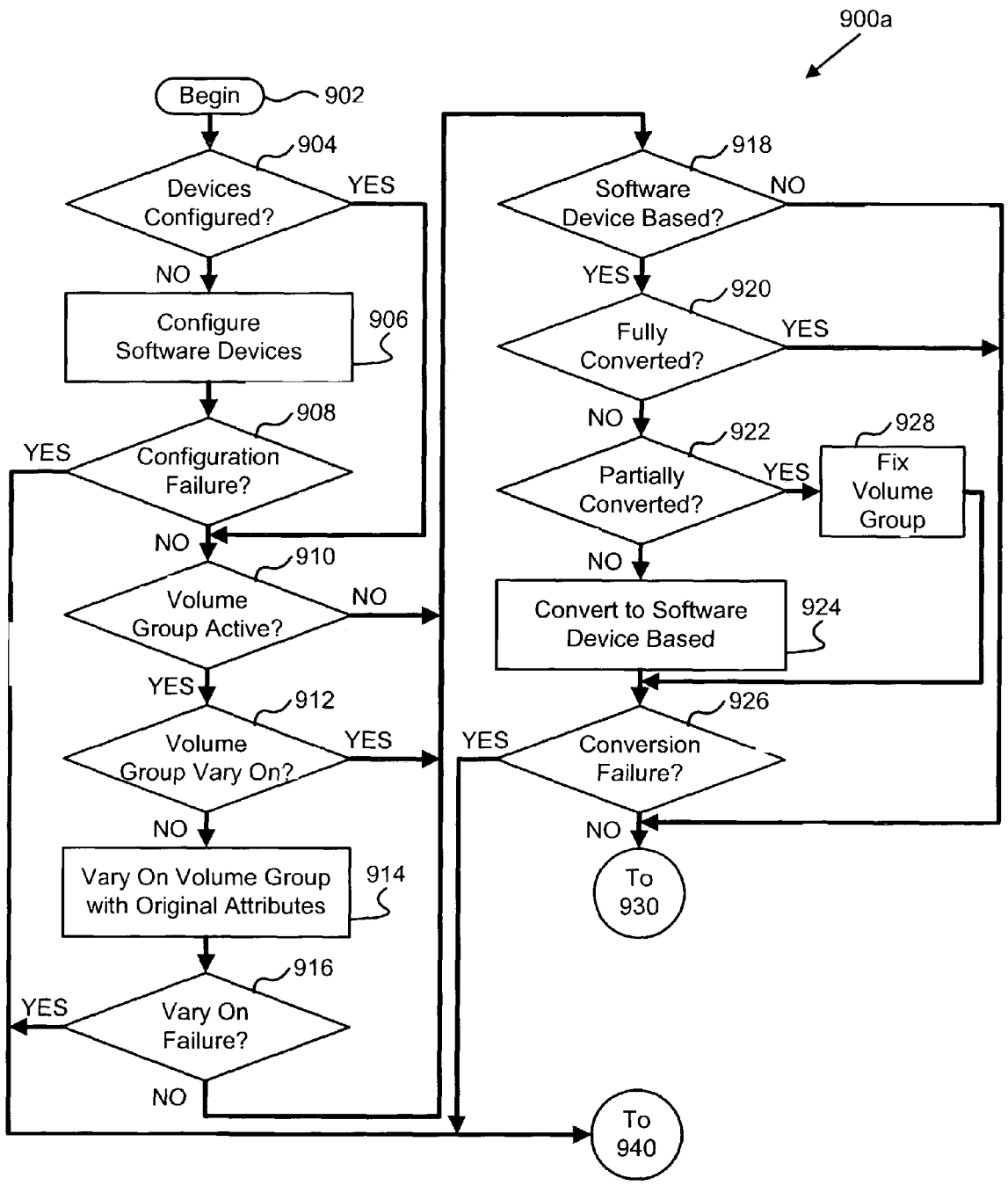
FIGS. 9a and 9b are schematic flow chart diagrams illustrating one embodiment of a recovery process in accordance with the present invention.
Figure 9B:
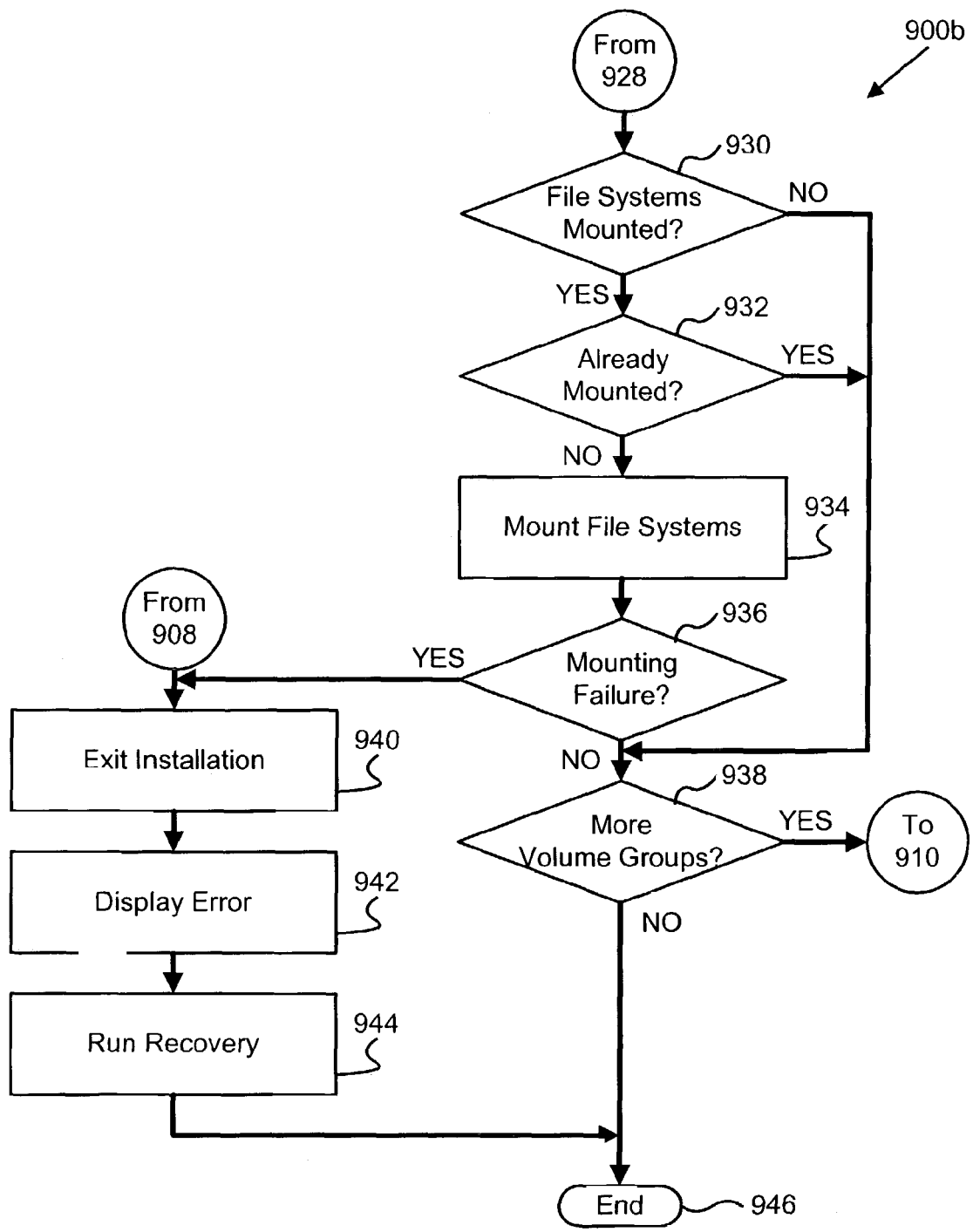

FIGS. 9a and 9b depict one embodiment of a more detailed recovery process 900 given by way of example of the recovery sub-process 832 of FIG. 8b. For convenience, the recovery process 900 is shown in a first part 900a and a second part 900b, but will be referred to collectively as the recovery process 900. Execution of the recovery process 900 is preferably administered by the recovery module 318 of the software installation module 310 in the server 300.

As described above, the recovery process 900 occurs after the new software has been installed on a software device and a failure has occurred during the post-installation process 800. The recovery process 900 is substantially similar to the post-installation process and is designed to reconfigure the software devices having the newly installed software and restore the system configuration of the logical volume manager (LVM). The depicted recovery process 900 begins 902 by determining 904 if the software devices were successfully configured during the post-installation process 800 and, if not, configures 906 the software devices. The configuration step 906 of the recovery process 900 is substantially similar to the configuration step 804 of the post-installation process 800.

The recovery process 900 then determines 908 if a configuration failure occurred. The determination step 908 of the recovery process 900 is substantially similar to the determination step 806 of the post-installation process 800. If a configuration failure did not occur, the recovery process 900 determines 910 if a volume group 216 was active prior to the installation of the new software. The determination step 910 of the recovery process 900 is substantially similar to the determination step 808 of the post-installation process 800. If the volume group 216 was active, the recovery process 900 determines if the volume group 216 was successfully varied on during the post-installation process 800 and, if not, varies on the volume group 216 and determines 812 if a vary on failure occurred. The vary on step 914 and determination step 916 of the recovery process 900 are substantially similar to the vary on step 810 and determination step 812, respectively, of the post-installation process 800.

If the volume group 216 was not active or if the volume group 216 was successfully varied on, the recovery process 900 then determines 918 if the volume group 216 was software device based prior to the installation of the new software. The determination step 918 of the recovery process 900 is substantially similar to the determination step 814 of the post-installation process 800. If the volume group 216 was software device based, the recovery process 900 determines 920 if the volume group 216 was successfully and fully converted during the post-installation process 800 and, if not, the recovery process 900 determines 922 if the volume group 216 was at least partially converted during the post-installation process 800.

If the volume group was partially converted during the post-installation process 800, the recovery process 900 fixes 928 the volume group 216 by finalizing the conversion. Otherwise, the recovery process 900 converts 924 the volume group 216 back to software device based and then determines 926 if a conversion failure occurred. The conversion step 924 and determination step 926 of the recovery process 900 are substantially similar to the conversion step 816 and determination step 818, respectively, of the post-installation process 800.

If the volume group 216 was not software device based or if the volume group 216 was successfully converted to software device based, the recovery process 900 then determines 930 if the file systems were mounted prior to the installation of the new software. The determination step 930 of the recovery process 900 is substantially similar to the determination step 820 of the post-installation process 800. If the file systems were mounted, the recovery process 900 then determines 932 if the file systems were successfully mounted during the post-installation process 800 and, if not, then mounts 934 the file systems and determines 936 if a mounting failure occurred. The mounting step 934 and determination step 936 of the recovery process 900 are substantially similar to the mounting step 822 and determination step 824, respectively, of the post-installation process 800.

If the file systems were not mounted or if the file systems were successfully mounted, the recovery process 900 determines 938 if additional volume groups 216 need to be processed and, if so, iteratively returns to step 910 to determine if the additional volume group 216 was active and to repeat the described steps of the recovery process 900. The determination step 938 of the recovery process 900 is substantially similar to the determination step 826 of the post-installation process 800.

If the recovery process 900 determines 908 that there is a configuration failure, determines 916 that there is a vary on failure, determines 926 that there is a conversion failure, or determines 936 that there is a mounting failure with one or more of the volume groups 216 being processed, the recovery process 900 proceeds to exit 940 the installation and display 942 an error to a system administrator. In one embodiment, system administrator may run 944 a subsequent recovery sub-process, such as the recovery process 900. The exiting step 940, displaying step 942, and recovery step 944 of the recovery process 900 are substantially similar to the exiting step 828, displaying step 830, and recovery step 832, respectively, of the post-installation process 800. After either processing all of the necessary volume groups 216 or exiting the installation due to a failure, the depicted recovery process 900 ends 946.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable storage medium comprising computer readable code configured to carry out a process, for automatically backing up and restoring a system configuration of a logical volume manager in conjunction with installing software on a software device configured under the logical volume manager, comprising:

a pre-removal module configured to automatically execute a pre-removal procedure prior to installing the software on the software device, the pre-removal procedure including backing up a system configuration of the logical volume manager and removing the software device from the electronic environment of the software device in preparation for a software installation on the first storage software device;

a post-installation module configured to automatically execute a post-installation procedure after installing the software on the software device, the post-installation procedure including reconfiguring the software device and restoring the system configuration of the logical volume manager in response to a software installation on the software device; and a file packaging module configured to embed the pre-removal and post-installation procedures in a packaging file.

2. The apparatus of claim 1, wherein installing software comprises installing executable computer code.

3. The apparatus of claim 1, wherein the software device comprises an electronic storage device.

4. The apparatus of claim 1, wherein the packaging file is automatically executed during installation of the software on the software device.

5. The apparatus of claim 1, further comprising a recovery reconfiguration module configured to reconfigure the software device after installing the software on the software device in response to a failed attempt by the reconfiguration module to reconfigure the software device.

6. The apparatus of claim 1, wherein the pre-removal further comprises unmounting a volume group file system.

7. The apparatus of claim 1, further comprising a recovery restoration module configured to restore the system configuration of the logical volume manager after installing the software on the software device in response to a failed attempt by the restoration module to restore the system configuration.

8. The apparatus of claim 1, further comprising a system configuration module configured to store system configuration information of the logical volume manager.

9. The apparatus of claim 1, further comprising a software device module configured to store software device information and to manage the operation of the storage software device.

10. A system for automatically backing up and restoring a system configuration of a logical volume manager in conjunction with installing software on a software device, the system comprising:

a storage server having a plurality of storage software devices;

a logical volume manager configured to interface with the storage server and manage the plurality of storage software devices;

a software installation module configured to interface with the storage server and the logical volume manager and to manage the installation of software on a first storage software device of the plurality of storage software devices;

a pre-removal module configured to implement a pre-removal procedure, including backing up a system configuration of the logical volume manager and removing the first storage software device from the electronic environment of the software device in preparation for a software installation on the first storage software device;

a post-installation module configured to implement a post-installation procedure, including reconfiguring the first storage software device and restoring the system configuration of the logical volume manager in response to a software installation on the first storage software device; and a file packaging module configured to embed the pre-removal and post-installation procedures in a packaging file.

11. The system of claim 10, wherein the logical volume manager does not require rebooting after installation of the software on the software device.

12. A system for automatically backing up and restoring a system configuration of a logical volume manager in conjunction with installing software on a software device, the system comprising:

a first storage server having a first plurality of storage software devices;

a second storage server having a second plurality of storage software devices and connected to the first storage server to form a storage area network;

a logical volume manager configured to interface with the storage area network and manage the first and second pluralities of storage software devices;

a software installation module configured to interface with the server and the logical volume manager and to manage the installation of software on a first storage software device of the plurality of storage software devices;

a pre-removal module configured to implement a pre-removal procedure, including backup a system configuration of the logical volume manager and remove the first storage software device from the electronic environment of the software device in preparation for a software installation on the first storage software device;

a post-installation module configured to implement a post-installation procedure, including reconfigure the first storage software device and restore the system configuration of the logical volume manager in response to a software installation on the first storage software device; and a file packaging module configured to embed the pre-removal and post-installation procedures in a packaging file.

13. A process for automatically backing up and restoring a system configuration of a logical volume manager in conjunction with installing software on a software device configured under the logical volume manager, the process comprising:

automatically executing a pre-removal procedure prior to installing the software on the software device, the pre-removal procedure including backing up a system configuration of the logical volume manager and removing the first storage software device from the electronic environment of the software device in preparation for installing the software on the software device;

automatically executing a post-installation procedure after installing the software on the software device, the post-installation procedure including reconfiguring the software device and restoring the system configuration of the logical volume manager in response to installing the software on the software device; and embedding the pre-removal and post-installation procedures in a packaging file.

14. The process of claim 13, wherein installing software comprises installing executable computer code.

15. The process of claim 13, wherein the software device comprises an electronic storage device.

16. The process of claim 13, wherein the packaging file is automatically executed during installation of the software on the software device.

17. The process of claim 13, further comprising reconfiguring the software device after installing the software on the software device in response to a failed attempt by the reconfiguration module to reconfigure the software device.

18. The process of claim 13, wherein the pre-removal procedure further comprises varying off a volume group.

19. The process of claim 13, further comprising restoring the system configuration of the electronic device after installing the software on the software device in response to a failed attempt by the restoration module to restore the system configuration.

20. A computer readable storage medium comprising computer readable code configured to carry out a process for automatically backing up and restoring a system configuration of a logical volume manager in conjunction with installing software on a software device of a storage system with a logical volume manager, the process comprising:
 automatically executing a pre-removal procedure prior to installing the software on the software device, the pre-removal procedure including backing up a system configuration of the logical volume manager and removing the first storage software device from the electronic environment of the software device in preparation for a software installation on the software device;
 automatically executing a post-installation procedure after installing the software on the software device, the post-installation procedure including reconfiguring the software device and restoring the system configuration of the logical volume manager in response to a software installation on the software device; and
 embedding the pre-removal and post-installation procedures in a packaging file.

21. The computer readable storage medium of claim 20, wherein installing software comprises installing executable computer code.

22. The computer readable storage medium of claim 20, wherein the software device the software device comprises an electronic storage device.

23. The computer readable storage medium of claim 20, wherein the packaging file is automatically executed during installation of the software on the software device.

24. The computer readable storage medium of claim 20, wherein the process further comprises reconfiguring the software device after installing the software on the software device in response to a failed attempt by the reconfiguration module to reconfigure the software device.

25. The computer readable storage medium of claim 20, wherein the system configuration comprises at least one of a volume group identifier, a physical volume identifier, a physical volume device type, and an attribute of a volume group.

26. The computer readable storage medium of claim 25, wherein the process further comprises restoring the system configuration of the logical volume manager after installing the software on the software device in response to a failed attempt by the restoration module to restore the system configuration.

27. The computer readable storage medium of claim 20, wherein the process further comprises storing system configuration information of the logical volume manager.

28. The computer readable storage medium of claim 20, wherein the process further comprises storing software device information and managing the operation of the storage software device.

29. A computer readable storage medium comprising computer readable code configured to carry out a process, for automatically backing up and restoring a system configuration of a logical volume manager in conjunction with installing software on a software device, comprising:
 means for automatically executing a pre-removal procedure prior to installing the software on the software device;
 means for automatically executing a post-installation procedure after installing the software on the software device;
 means for embedding the pre-removal and post-installation procedures in a packaging file;
 means for removing the software device from the electronic environment of the software device prior to installing the software on the software device;
 means for reconfiguring the software device after installing the software on the software device; and
 means for restoring the system configuration of the electronic device after installing the software on the software device.

* * * * *